Oct. 22, 1963 L. T. EMMER 3,107,405
SAFETY CLIP FOR EYE GLASSES
Filed Feb. 21, 1961

INVENTOR.
LASZLO T. EMMER

3,107,405
SAFETY CLIP FOR EYE GLASSES
Laszlo T. Emmer, 26 Amboy Ave., Metuchen, N.J.
Filed Feb. 21, 1961, Ser. No. 90,697
4 Claims. (Cl. 24—3)

This invention relates to eye glasses and more particularly, to an accessory therefor.

It is an object of the present invention to provide a safety case for eye glasses which will prevent the accidental loss thereof by detachably securing the case with the glasses contained therewithin to the pocket within which the case is disposed.

Another object of the present invention is to provide a safety clip for eye glasses of the above type which is extremely attractive in appearance, may be used for decorative as well as for safety purposes, and which can be readily applied to all existing and new types of eye glass cases.

Other objects of the invention are to provide a safety clip for eye glasses bearing the above objects in mind which is of simple construction, has a minimum number of parts, is inexpensive to manufacture, and efficient in operation.

For other objects and for a better understanding of the invention, reference may be had to the following detailed description taken in conjunction with the accompanying drawing, in which.

Figure 1:
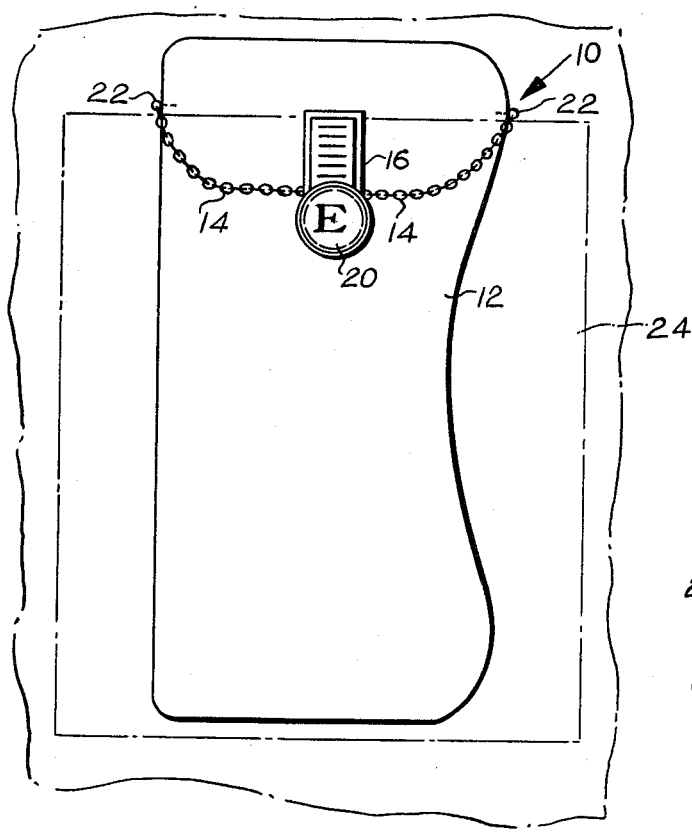
FIGURE 1 is a front plan view, of a safety eye glass case and attached safety clip made in accordance with the present invention.
Figure 2:
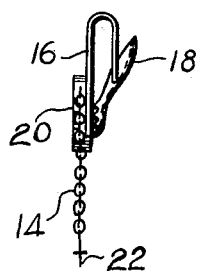
FIGURE 2 is a side elevational view of the safety clip shown in FIGURE 1.
Figure 3:
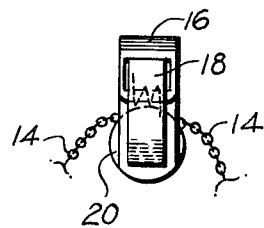
FIGURE 3 is a rear elevational view of the safety clip shown in FIGURE 1.

Referring now more in detail to the drawing, a safety eye glass case 10 made in accordance with the present invention is shown to include a main body portion 12 having an upwardly opening compartment within which a pair of eye glasses may be slidably received. A pair of flexible chains 14 are each secured at one end to a stationary part 16 of a safety clip assembly having a pivotally mounted spring clip 18 carried upon the rear side thereof. The jaw of the spring clip 18 acts with the rear portion of the stationary part 16 to releasably clamp portions of the pocket 24 therebetween.

A medallion or other piece of jewelry 20 may be secured to the front side of the stationary part 16 to provide a highly attractive and decorative effect. The opposite end of each flexible chain 14 is provided with a short stubby pin 22 which is extended into the adjacent side of the case 12, thus connecting the spring clip assembly to the case 12.

In actual use, the glass may be inserted and removed from the case 12 without interfering with the operation of the parts. The case 12 is placed within any pocket 24, and the upper opening defining edge of the pocket is placed between the stationary part 16 of the spring clip and the jaw of the pivoted clip member 18, thus clampingly engaging the pocket and preventing the accidental removal of the eye glass case 12 from the pocket. If desired, the free end of each chain 14 may be detachably mounted upon the main body of the eye glass case for use with any eye glass case being used.

While various changes may be made in the detail construction, it shall be understood that such changes shall be within the spirit and scope of the present invention as defined by the appended claims.

What I claim as new and desire to protect by Letters Patent of the United States is:

1. A safety case for eye glasses comprising, in combination, an elongated case having an open upper end, said case having a central compartment for receiving a pair of eye glasses slidably therewithin, said case having sealed bottom and opposite side edges to form said central compartment, flexible chain means connected to said case, a releasable pocket-engaging clip connected to said flexible chain means at the midportion thereof, said pocket-engaging clip being movable laterally and longitudinally within the confined limits relative to said case, said limits being defined within the peripheral top, side and end edges of said case.

2. The combination according to claim 1, wherein said clip comprises a stationary part and a pivotally mounted clip member having a jaw yieldably urged toward a facing portion of said stationary part for clampingly receiving an opening defining portion of said pocket therewithin.

3. The combination according to claim 2, wherein said flexible chain means comprises a pair of flexible chains, one end of each of said pair of chains being connected to said stationary part of said clip, and the opposite free end of each one of said pair of chains being connected to opposite sides of said case.

4. The combination according to claim 3, further comprising securement means securing each free end of said chains to said case, said securement means comprising a pair of short stubby pins each connected to one of said flexible chains and engaged with one of said opposite sides of said case.

References Cited in the file of this patent

UNITED STATES PATENTS

| D. 94,425 | Johnson | Jan. 29, 1935 |
| 275,795 | Watts | Apr. 10, 1883 |
| 287,460 | Pattee et al. | Oct. 30, 1883 |
| 328,369 | Wilcox | Oct. 13, 1885 |
| 855,833 | Brown | June 4, 1907 |
| 1,688,506 | Rivers | Oct. 23, 1928 |
| 2,111,994 | Roth | Mar. 22, 1938 |
| 2,245,463 | Cohn | June 10, 1941 |
| 2,887,747 | Bellman | May 26, 1959 |

FOREIGN PATENTS

| 15,875 | Great Britain | 1892 |